Patented Mar. 9, 1954

2,671,766

UNITED STATES PATENT OFFICE 2,671,766

PROCESS OF PRODUCING SILVER SURFACE CATALYSTS AND SUCH CATALYSTS

Donald K. Sacken, Austin, Tex., assignor to Jefferson Chemical Company, Inc., New York, N. Y., a corporation of Delaware No Drawing. Application October 1, 1951, Serial No. 249,223

16 Claims. (Cl. 252—476)

This invention relates to the production of silver surface catalysts for catalyzing the oxidation of olefins to olefin oxides, for example, ethylene to ethylene oxide, and to the resultant catalysts.

In the catalytic oxidation of olefins to olefin oxides, particularly ethylene to ethylene oxide, side reactions take place, such as the complete oxidation of the ethylene to carbon dioxide and water, oxidation of the desired ethylene oxide product and its conversion to acetaldehyde which may then itself be further oxidized. The complete oxidation of ethylene to carbon dioxide and water liberates much more heat than the desired partial oxidation to ethylene oxide with consequent local overheating of the catalysts and formation of hot spots in the reactor. These hot spots favor complete oxidation of the ethylene to carbon dioxide so that a runaway reaction ensues and the yield of desired ethylene oxide is sharply reduced.

Among the objects of this invention is to provide a silver surface catalyst for the oxidation of olefins to olefin oxides, particularly ethylene to ethylene oxide, which catalyst is of high activity and selectivity from the standpoint that it tends to favor the desired main reaction, i. e., the partial oxidation to olefin oxides.

Another object of this invention is to provide a novel method of producing such catalysts.

Other objects and advantages of this invention will be apparent from the following detailed description thereof.

In accordance with this invention a silver surface catalyst is produced by co-precipitating silver oxide and a silver salt that is appreciably more soluble than silver oxide. The silver salt is thereafter removed from the co-precipitate by washing with a solvent for the silver salt and the resultant silver oxide is deposited on a carrier or support. Silver catalysts thus produced have been found to be of surprisingly high activity and selectivity in the oxidation of olefins to olefin oxides, particularly ethylene to ethylene oxide.

The relatively more soluble silver salt and silver oxide are co-precipitated in a weight ratio of at least about .75 part of silver oxide per part of silver salt and preferably in a weight ratio of about from 1 to about 10 parts of silver oxide per part of silver salt.

Silver nitrate, or other soluble silver salt, is treated with sodium hydroxide, potassium hydroxide, barium hydroxide or other hydroxide which precipitates silver oxide. Simultaneously, the relatively more soluble silver salt is precipitated. Silver nitrate, or other soluble silver salt, may be treated, for example, with (1) sodium hydroxide and sodium sulfate to co-precipitate silver oxide and silver sulfate, (2) sodium hydroxide and sodium acetate to co-precipitate silver oxide and silver acetate, (3) sodium hydroxide and a sodium, potassium, magnesium or barium permanganate to co-precipitate silver oxide and silver permanganate, (4) sodium hydroxide and sodium or potassium nitrite to co-precipitate silver oxide and silver nitrite, (5) sodium hydroxide and sodium, potassium, or ammonium tartrate to co-precipitate silver oxide and silver tartrate, (6) sodium hydroxide and sodium, potassium, or ammonium citrate to co-precipitate silver oxide and silver citrate, or (7) sodium hydroxide and sodium, potassium, or ammonium propionate to co-precipitate silver oxide and silver propionate. In all of the aforementioned examples the sodium hydroxide may be replaced by potassium or other alkali metal or alkaline earth metal hydroxide which precipitates silver oxide.

The silver sulfate, acetate, permanganate, nitrate, tartrate, citrate and propionate, as the case may be, is relatively much more water soluble than is the silver oxide. The co-precipitate of silver oxide and silver salt is accordingly washed with water, preferably distilled water, to effect the removal, desirably the complete removal, of the relatively water soluble silver salt. The residual silver oxide is then deposited on a carrier or support to produce the catalyst.

While it is not known exactly how the co-precipitation of the silver oxide and relatively more soluble silver salt followed by the removal of this silver salt from the silver oxide affects the catalyst, surprisingly it has been found that the catalyst thus produced is substantially more selective from the standpoint of favoring the desired partial oxidation of the olefins to olefin oxides than silver oxide catalysts made by precipitating silver oxide alone and depositing the silver oxide on a carrier. It is believed that the effect of the co-precipitation of the silver oxide and relatively more soluble silver salt followed by the extraction of the silver salt results in a silver oxide in a highly active skeleton form. While the examples given below support the above theory or explanation of operation, it will be understood the invention is not limited to this theory or possible explanation.

As the carrier or support, silicon carbide and fused or crystalline alumina refractory materials including but without limitation, Alundum, Alusite, Mullite and tabular corundum, crushed and screened to a convenient size, say from a fine dust to about 2 mesh, may be used. Any of the known carriers employed in the production of silver surface catalysts used for catalyzing the olefin to olefin oxide reaction may be employed. The exact size of the carrier particles will depend chiefly on the manner in which the catalyst is employed. In the case of fixed bed catalysts the preferred range of sizes is from 70 to 220 mesh (passing 70 and retained on 220 mesh screen) up to 2 mesh. Particularly preferred for fixed bed catalysts are catalyst particles having a size of from 2 to 10 mesh. For catalysts employed in accordance with the fluidized technique, the particle size may be within the range of from a fine dust to approximately 70 mesh. A preferred carrier is a fused aluminum oxide, such as the product designated as Alundum No. 38 by the Norton Company.

The description which follows will largely be confined to the production of co-precipitated silver oxide, silver sulfate catalysts which are the preferred catalysts. It will be understood, however, that the invention is not limited to this preferred embodiment, but includes the production of other silver oxide catalysts in which in lieu of the silver sulfate other relatively more soluble silver salts, such as silver acetate, permanganate, nitrite, tartrate, citrate, propionate, etc. are co-precipitated with the silver oxide. Further, while in the description which follows sodium hydroxide is referred to as the precipitating medium to produce the silver oxide, it will be understood that potassium hydroxide and other alkali and alkaline earth metal hydroxides which precipitate silver oxide may be employed.

The co-precipitate may be prepared by treating the silver nitrate solution or solutions of other soluble silver salt with a pre-mixed solution of sodium sulfate and sodium hydroxide. This pre-mixed solution may contain all or only a portion of the sodium hydroxide employed to effect the precipitation. When it contains only a portion of the sodium hydroxide, the remainder of the sodium hydroxide is added to the reaction mixture after the premixed sodium sulfate and sodium hydroxide have been mixed with the silver nitrate. The preferred procedure, however, is to add the sodium sulfate first to the silver nitrate solution followed by the addition of the sodium hydroxide immediately thereafter, so as to effect co-precipitation of the silver oxide and silver sulfate. Addition of the sodium sulfate followed by the addition of the sodium hydroxide to the aqueous silver nitrate solution permits the silver sulfate to form nuclei or particles upon which the silver oxide builds.

The amount of sodium hydroxide employed should be at least equal to the stoichiometric amount required to react with that portion of the silver nitrate in excess of that portion which forms the silver sulfate. However, an excess of from 10% to 50% over and above this stoichiometric amount may be used, preferably a 20% excess of sodium hydroxide is employed. As above noted the weight ratio of silver oxide to silver sulfate precipitated is at least .75 to 1 and preferably is from 1 to 10 to 1.

The temperature of the precipitation medium may vary from just above 0° C. to just below the boiling point of water, say within the range of 5° to 95° C. Preferably, the precipitation is effected at temperatures within the range of 15° to 80° C. Following the precipitation but before the co-precipitate is washed, the co-precipitate is preferably digested at the temperature of precipitation, say at temperatures of from 5° to 95° C. for from 5 to 30 minutes. Preferably, this digestion is carried out at a temperature of from 60° to 80° C. for about 30 minutes, since it has been found digestion at such temperature for about 30 minutes provides reproducible batches from the standpoint of catalytic activity and selectivity.

Following the digestion treatment the co-precipitate is separated from the reaction mixture, for example, by decantation and then washed, desirably with distilled water at a temperature of from 5° to 95° C., preferably from 25° to 35° C., to effect removal of the silver sulfate. In the preferred operation the co-precipitate is subjected to repeated washings until all of the silver sulfate has been removed or only a trace remains. Catalysts having improved selectivity as compared with silver oxide catalysts not embodying this invention result even though as much as 30% of the silver sulfate remains. Such catalysts have been found to be of materially lower activity than the catalysts in which substantially all of the silver sulfate has been removed from the co-precipitate. By "activity of the catalyst" is meant the percent. of the olefin which is oxidized. The residual silver oxide is then dried. This drying may be carried out at any temperature below the sintering temperature of the silver oxide, preferably drying is effected at a temperature within the range of from 105° to 215° C.

The resultant silver oxide is then deposited on a support or carrier, desirably by agitating the support with a slurry or paste of the silver oxide. Preferably, but not necessarily, from 15% to 150% sodium sulfate, based on the weight of silver oxide, is dissolved in the slurry or paste which is deposited on the carrier. This addition of sodium sulfate exercises a stabilizing effect upon the life of the catalyst. The silver oxide and support are mixed in proportions to result in a catalyst containing from 1% to 50%, desirably 2% to 20% and preferably 2% to 10%, by weight of silver oxide based on the weight of the support.

In use of the catalyst the silver oxide is converted to silver by heating, desirably by passing a stream of olefin and air at a temperature of 250°–290° C. over the catalyst. If desired, before the catalyst is introduced into the converter it may be subjected to a reduction treatment, say with ammonia or hydrogen or such reduction treatment may be carried out in the converter before the reactants are introduced thereinto. It will be understood that the expression "silver catalyst" is employed in the specification and claims to include silver oxide catalysts.

The following examples are illustrative of preferred embodiments of the invention. It will be understood this invention is not limited to these examples.

*Example I*

A solution of silver nitrate was prepared by dissolving 15.8 grams of silver nitrate in 150 ml. of distilled water. A separate solution of sodium hydroxide and sodium sulfate was prepared by dissolving 3 grams of sodium hydroxide and 1.32 grams of sodium sulfate in 50 ml. distilled water. The sodium hydroxide sodium sulfate solution was added to the silver nitrate solution, both being at room temperature (25° to 30° C.) and stirred for 20 to 30 seconds. After standing from 10 to 15 minutes the precipitates were washed three times using 250 ml. distilled water per wash. 200 grams of Alundum 70-220 mesh which had previously been washed with distilled water and dried were added to the resultant precipitate and the mixture stirred to substantially uniformly deposit the silver oxide on the carrier. The catalyst was then dried while stirring.

The catalyst thus prepared was tested in a stainless steel converter by passing a mixture of air and ethylene containing 10 volumes of air per volume of ethylene at a space velocity of about 400 and an average contact time of 2.4 seconds through a fixed bed of the catalyst maintained at a temperature of about 280° C. Approximately 37.9% of the feed ethylene was converted to ethylene oxide while 25.2% was oxidized to carbon dioxide and water; thus, 60.1% of the ethylene reacted was recovered as ethylene oxide.

For comparative purposes a catalyst was prepared by coating the same type of catalyst support wtih silver oxide made by precipitation from aqueous silver nitrate with sodium hydroxide and likewise washed with distilled water. This catalyst was tested in the same manner. It showed a 19.8% conversion of ethylene to ethylene oxide while 30.3% of the ethylene was oxidized to carbon dioxide and water. In the comparative example the yield of ethylene oxide from the total reacted ethylene was 39.5% as compared with 60.1% employing the catalyst of this invention.

*Example II*

316 grams of silver nitrate were dissolved in 2 liters of distilled water and the solution heated to 69° C. Separate solutions of sodium hydroxide and sodium sulfate were prepared by dissolving 56.4 grams of sodium sulfate and 51.2 grams of sodium hydroxide, respectively, in 500 ml. portions of distilled water. 200 ml. of the sodium hydroxide solution were mixed with the sodium sulfate solution and this mixture added to the hot silver nitrate solution while agitating. 30 seconds later the remainder of the sodium hydroxide solution was added to the silver nitrate solution while continuing the agitation for 3 minutes. After stopping the agitation the precipitates were allowed to settle and digest at a temperature of 61° to 66° C. for 30 minutes. The mixture was allowed to cool to about 53° C. and the aqueous liquid decanted from the precipitate. The precipitate was washed by decantation with five 3-liter portions and one liter portion of distilled water. The temperatures of the washes were in the range of from 27° to 34° C. Each wash involved stirring the co-precipitate with the distilled water for about 2 minutes and then allowing the mixture to settle before decanting. The washed precipitate was dried in a forced circulation oven for about 16 hours at 120° C.

A second batch was prepared in an identical fashion to that described above and the two batches combined. 24 grams of the combined dried precipitates were slurried with about 100 ml. of distilled water and then passed through a homogenizer to reduce the particle size. 6 grams of sodium sulfate were dissolved in the slurry. The resultant mixture was sprayed by means of a spray gun on to 300 grams of 8 to 16 mesh silicon carbide contained in a heated rotating cylinder. Drying was effected almost instantly.

The resultant catalyst was tested in the same manner as described in Example I. After 36 hours 22.5% of the feed ethylene was oxidized to ethylene oxide and 12% of the feed ethylene was oxidized to carbon dioxide and water resulting in 65.2% yield of ethylene oxide from the reacted ethylene.

For comparative purposes silver oxide precipitated from an aqueous silver nitrate solution by the addition of sodium hydroxide was washed eight times with distilled water and then coated on the same type of silicon carbide support. This catalyst was tested in the same manner and showed .3% of the feed ethylene was oxidized to ethylene oxide and 52.4% was oxidized to carbon dioxide and water resulting in a yield of .6% of ethylene oxide from the reacted ethylene.

*Example III*

One hundred and forty grams of the combined and dried precipitates of Example II were slurried with distilled water and passed through a homogenizer. Twenty-five grams of sodium sulfate were dissolved in this slurry. The resultant slurry was then sprayed onto 600 grams of 4-8 mesh Alundum.

After 34 hours of operation, in the same manner as in Example I, 51.2% of the feed ethylene was oxidized to ethylene oxide and 30.8% of the feed ethylene to carbon dioxide and water, resulting in a yield of 62.4%.

*Example IV*

The catalysts used in this example were prepared in the same manner as described in Example I, except that the ratio of the weights of sodium hydroxide and sodium sulfate were varied to obtain co-precipitates having a weight ratio of silver oxide to silver sulfate as indicated in the table below. Each co-precipitate after extraction of silver sulfate as described in Example I was coated on 70-220 mesh Alundum. The resultant catalyst batches were tested employing the test procedure described in Example I.

| Batch | Weight Ratio Silver Oxide to Silver Sulfate | Conversion, Percent | Yield, Percent | Activity, Percent |
|---|---|---|---|---|
| 1 | 1:1 | 40.2 | 57.1 | 70.4 |
| 2 | 2:1 | 41.5 | 60.0 | 69.2 |
| 3 | 3:1 | 37.9 | 60.0 | 63.2 |

*Example V*

The catalysts used in this example were prepared in the same manner as described in Example I, except that the amount of sodium hydroxide employed in making successive batches of catalyst was varied. The amount of sodium sulfate used was such that if it all reacted to form silver sulfate and the balance of the silver nitrate reacted to form silver oxide, the weight of the silver sulfate would just equal that of the silver oxide. Additional sodium hydroxide in excess of that required to precipitate the excess of silver over that which reacted to form the sulfate was added as noted in column 2 of the table which follows. Each co-precipitate after extraction of silver sulfate as described in Example I was coated on 70-220 mesh Alundum.

The resultant catalyst batches were tested employing the test procedure described in Example I with the following results:

| Batch | Excess NaOH, Percent | Conversion, Percent | Yield, Percent | Activity, Percent |
|---|---|---|---|---|
| 1 | 0 | 30.3 | 51.9 | 58.1 |
| 2 | 10 | 35.3 | 48.8 | 72.3 |
| 3 | 20 | 37.5 | 51.4 | 73.0 |
| 4 | 30 | 36.1 | 57.1 | 63.2 |
| 5 | 40 | 36.9 | 59.0 | 62.5 |
| 6 | 50 | 34.6 | 57.2 | 60.5 |

*Example VI*

Twenty-five grams of silver nitrate were dissolved in 250 ml. distilled water and heated to 75° C. A sodium hydroxide solution was prepared by dissolving 4.15 grams of sodium hydroxide in 50 ml. distilled water. A sodium acetate solution was prepared by dissolving 5 grams of sodium acetate in 50 ml. distilled water. 10 ml. of the sodium hydroxide solution were mixed with the sodium acetate solution and this mixture added to the hot silver nitrate solution while stirring. In about 30 seconds the remainder of the sodium hydroxide was added and the precipitates stirred for another 3 minutes. The precipitates were then digested, without stirring, for 30 minutes at 65°–68° C. after which they were cooled to 51° C. and the mother liquor decanted. Three washes each of 250 ml. distilled water were applied at 26.5° C., which washes extracted substantially all of the silver acetate. The residual silver oxide was applied to 200 grams of 4–8 mesh Alundum by spraying.

The catalyst thus produced was tested in the same manner as described in Example I; the catalyst hot spot temperature was 280° C. The results were as follows:

| Hours of Use | Conversion, Percent | Yield, Percent | Activity, Percent |
|---|---|---|---|
| 4.1 | 25.6 | 63.9 | 40.1 |
| 8.9 | 31.7 | 62.7 | 50.6 |
| 28.8 | 32.9 | 62.3 | 52.8 |
| 52.8 | 30.1 | 59.7 | 50.4 |
| 76.6 | 23.7 | 55.6 | 42.6 |
| 100.8 | 21.6 | 58.7 | 36.8 |
| 120.2 | 18.9 | 54.8 | 34.5 |

In all of the above examples by "activity" is meant the percentage of the total ethylene which is oxidized. By the "yield" is meant the percentage of oxidized ethylene which is converted to ethylene oxide. By "conversion" is meant the percentage of the feed ethylene which is converted to ethylene oxide.

It will be noted from the above data on the tests made employing catalysts embodying this invention that the catalysts are surprisingly active and selective in favoring the desired partial oxidation of olefins to olefin oxides.

Since certain changes may be made in carrying out of the process of making the catalysts or in the catalysts themselves without departing from the scope of the invention, it is intended that all matter contained in the above description shall be interpreted as illustrative and not in a limiting sense.

What is claimed is:

1. In a process for producing a silver surface catalyst for catalyzing the oxidation of olefins to olefin oxides, the steps which comprise co-precipitating silver oxide and a silver salt relatively more water-soluble than silver oxide, removing the said silver salt from the co-precipitate and depositing the residual silver oxide on a support.

2. In the process for producing a silver surface catalyst for catalyzing the oxidation of olefins to olefin oxides, the steps which comprise co-precipitating silver oxide and a water soluble silver salt, washing the co-precipitate with water to extract the water soluble silver salt from the co-precipitate and depositing the residual silver oxide on a support.

3. In the process for producing a silver surface catalyst for catalyzing the oxidation of olefins to olefin oxides, the steps which comprise forming a solution of a water soluble silver salt, treating this solution with a hydroxide from the group consisting of alkali and alkaline earth metals and also with an alkali or alkaline earth metal salt thus forming a co-precipitate of silver oxide and a silver salt which is relatively more water-soluble than silver oxide, extracting the co-precipitated silver salt from the co-precipitate and depositing the residual silver oxide on a support.

4. A process for producing a silver surface catalyst for catalyzing the oxidation of olefins to olefin oxides, which comprises forming a solution of a relatively soluble silver salt, treating this solution with a hydroxide from the group consisting of alkali and alkaline earth metals and with a salt from the group consisting of alkali and alkaline earth metal sulfates, acetates, permanganates, nitrites, tartrates, citrates and propionates to co-precipitate silver oxide and a silver salt relatively more water-soluble than silver oxide, washing the co-precipitate of silver oxide and silver salt thus formed to extract the co-precipitated silver salt, depositing the residual silver oxide on a support and reducing the silver oxide to silver.

5. In a process for producing a silver surface catalyst for catalyzing the oxidation of olefins to olefin oxides, the steps which comprise co-precipitating silver oxide and silver sulfate, extracting the silver sulfate from the co-precipitate and depositing the residual silver oxide on a support.

6. In a process for producing a silver surface catalyst for catalyzing the oxidation of olefins to olefin oxides, the steps which comprise co-precipitating silver oxide and silver acetate, extracting the silver acetate from the co-precipitate and depositing the residual silver oxide on a support.

7. A process for producing a silver surface catalyst for catalyzing the oxidation of olefins to olefin oxides, which comprises treating silver nitrate solution with sodium hydroxide and sodium sulfate to co-precipitate silver oxide and silver sulfate, separating the co-precipitate from the mother liquor, washing the co-precipitate with water to extract silver sulfate, depositing the residual silver oxide on a support and reducing the silver oxide to silver.

8. A process as defined in claim 7, in which an excess of from 10% to 50% sodium hydroxide over and above the stoichiometric amount required to precipitate the silver oxide is employed in the process.

9. A process as defined in claim 7, in which from 15% to 150% of sodium sulfate based on the weight of silver oxide is added to the silver oxide prior to the deposition of the silver oxide on the support.

10. In a process for producing a silver surface catalyst, the steps which comprise forming a solution of soluble silver salt, adding sodium sulfate and sodium hydroxide to the solution, the relative amounts of sodium hydroxide and sodium sulfate thus added being such as to produce a co-precipitate containing from 0.75 to 10 parts by weight of silver oxide for each part of silver sulfate, extracting the silver sulfate from this co-precipitate and depositing the residual silver oxide on a carrier.

11. A process for producing a silver surface catalyst for catalyzing the oxidation of olefins to olefin oxides, which comprises forming a solution of silver nitrate, adding sodium sulfate to this solution, immediately thereafter adding sodium hydroxide to the solution, the relative amounts of sodium hydroxide and sodium sulfate thus added being such as to produce a co-precipitate containing from 0.75 to 10 parts by weight of silver oxide for each part of silver sulfate, washing the co-precipitate with water to effect removal of the silver sulfate therefrom, depositing the residual silver oxide on a support and reducing the silver oxide to silver.

12. A process as defined in claim 11, in which an excess of from 10% to 50% sodium hydroxide over and above the stoichiometric amount required to precipitate the silver oxide is employed in the process.

13. In a process for producing a silver surface catalyst for catalyzing the oxidation of olefins to olefin oxides, the steps which comprise forming a solution of silver nitrate, adding sodium sulfate to this solution, immediately thereafter adding sodium hydroxide to the solution, the relative amounts of sodium hydroxide and sodium sulfate thus added being such as to produce a co-precipitate containing from 0.75 to 10 parts by weight of silver oxide for each part of silver sulfate, washing the co-precipitate with water to effect removal of the silver sulfate therefrom, adding from 15% to 150% of sodium sulfate based on the weight of silver oxide to the residual silver oxide and depositing the mixture of sodium sulfate and silver oxide on a support.

14. A silver surface catalyst for the oxidation of olefins to olefin oxides, comprising a support having thereon silver oxide produced by co-precipitating silver oxide and a relatively soluble silver salt, removing the soluble silver salt from the co-precipitate and depositing the residual silver oxide on a support.

15. A silver surface catalyst for the oxidation of olefins to olefin oxides comprising a support having thereon silver oxide produced by co-precipitating silver oxide and silver sulfate, removing the silver sulfate from the co-precipitate and depositing the residual silver oxide on a support.

16. A silver surface catalyst for the oxidation of olefins to olefin oxides comprising a refractory support having thereon a deposit of sodium sulfate and silver oxide in a skeleton form producible by co-precipitating the silver oxide and a soluble silver salt and thereafter extracting the silver salt from the co-precipitate.

DONALD K. SACKEN.

References Cited in the file of this patent

UNITED STATES PATENTS

| Number | Name | Date |
|---|---|---|
| 2,125,333 | Carter | Aug. 2, 1938 |
| 2,424,085 | Bergsteinsson et al. | July 15, 1947 |
| 2,463,228 | West | Mar. 1, 1949 |